UNITED STATES PATENT OFFICE.

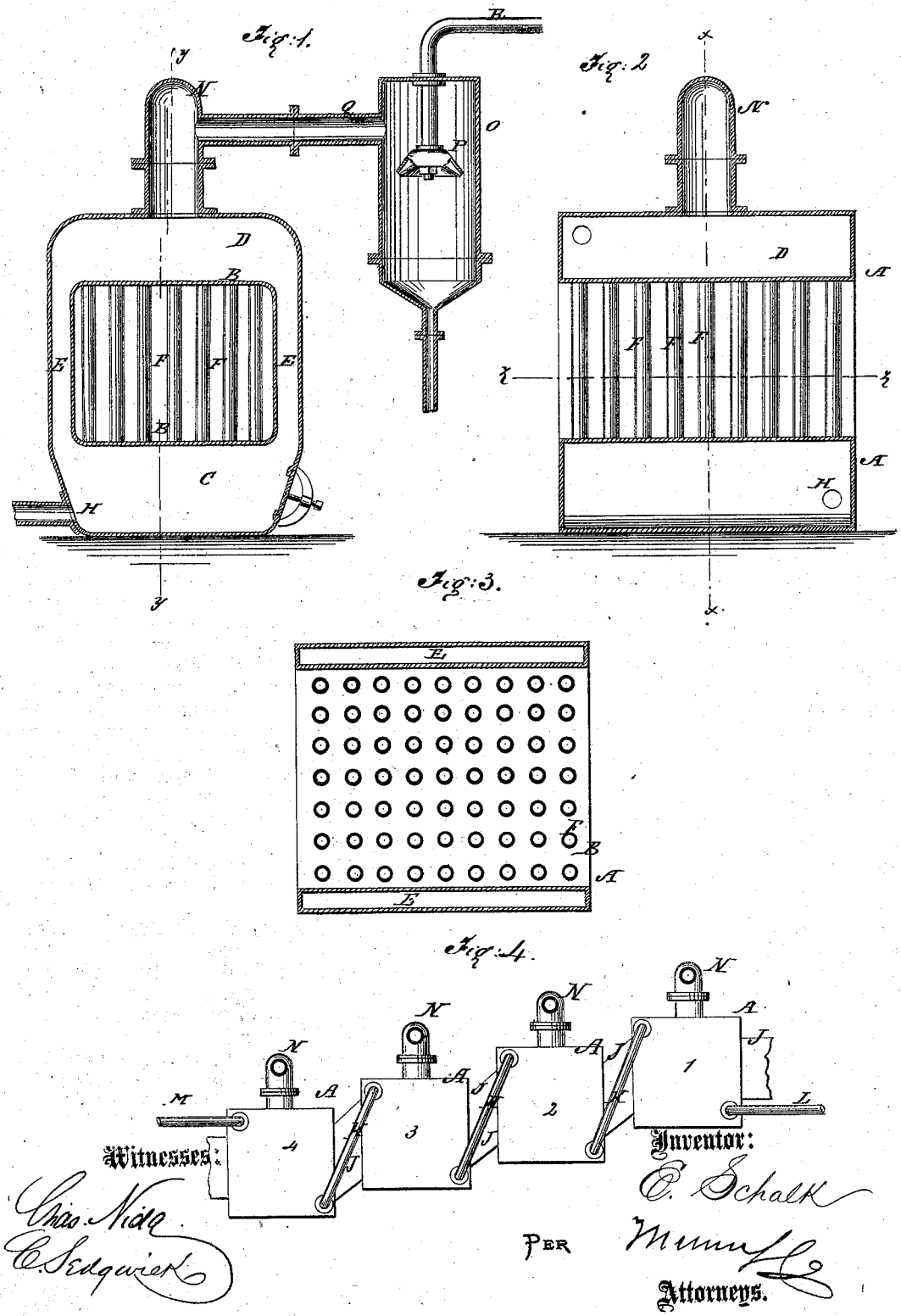

EMIL SCHALK, OF NEW YORK, N. Y.

IMPROVEMENT IN OIL-STILLS.

Specification forming part of Letters Patent No. 136,008, dated February 18, 1873.

*To all whom it may concern:*

Be it known that I, EMIL SCHALK, of the city, county, and State of New York, have invented a new and useful Improvement in Distilling Petroleum, of which the following is a specification:

The invention consists in the mode of combining and constructing the parts of a still, as hereinafter described and pointed out in the claim.

Figure 1 is a sectional elevation of my improved still and the condensing apparatus taken on the line $x\ x$ of Fig. 2, which is a sectional elevation taken on the line $y\ y$ of Fig. 1. Fig. 3 is a horizontal section taken on the line $z\ z$ of Fig. 2; and Fig. 4 is a side elevation of a series of stills, showing my arrangement for fractional and continuous distillation.

Similar letters of reference indicate corresponding parts.

A represents the retort or still, in which the oil is to be heated, which I provide with a large passage, B, through it from side to side between the bottom and top, so that a chamber, C, is preserved below, and another, D, above; also spaces E at the sides for the oil to be distilled; and through this passage I arrange vertical tubes F, as close together as will best promote the direct application of the heat which passes through the still at B to the oil, which circulates through the tubes, and not obstruct the draft.

The oil enters the chamber C at the pipe H, where the heat is lowest and the residue escapes from the upper chamber D, where the heat is greatest. The tubes being vertical and having a large chamber below, will not be obstructed by the accumulation of impurities, which has heretofore rendered all attempts to use tubes in petroleum-stills unsuccessful.

My plan for fractional and continuous distillation is represented in Fig. 4, by a series of four stills arranged side by side with flue connections J and pipe connections K; a connection, L, of still No. 1 with the crude-oil tank; a connection, M, of No. 4, with a receiver for the residuum; and a pipe-connection, N, of each still with a condenser. The first still is a little higher than the next and so on, and the fire is applied to No. 4, and passes through the series and escapes from No. 1 by the flue J'. The fire, as before stated, is supplied with liquid or gaseous fuel in regulated quantity, so that the heat will not only be regular, but will be graduated so that each still will be heated to the requisite degree for developing the special grade of oil belonging to its locality in the series. The heat will be lowest in still No. 1, into which the crude oil flows, and the product from it will be the highest grade; the next still will be hotter and the product lower, and so on, each still doing its fraction or portion of the work, according to its position in the series. There will be no deposit in the stills to cause a cessation of the work, because the residuum will pass off through pipe M to any receptacle where it can be disposed of without interrupting the work, and thus the process will be continuous. O represents the condenser with a distributing cone, P, in it below the pipe Q, by which the vapor enters. R is a pipe, by which the water will be discharged upon the cone to be distributed throughout the condenser in a conical sheet, through which the vapor must pass in descending to the space below, and which, by being regular and unbroken, effects the most rapid and perfect condensation.

Having thus described my invention, I claim as new and desire to secure by Letters Patent—

1. A still for securing the distilled products of petroleum, consisting of the retort A, having the large passage B from side to side, the lower chamber C, the upper chamber D, vertical chambers E E, and the vertical tubes F, all arranged as set forth.

2. The vertical tubes F, arranged and applied to a still, as and for the purpose set forth.

EMIL SCHALK.

Witnesses:
T. B. MOSHER,
C. SEDGWICK.